US007663476B2

(12) United States Patent
Watanabe et al.

(10) Patent No.: US 7,663,476 B2
(45) Date of Patent: Feb. 16, 2010

(54) SURROUNDING IMAGE GENERATING APPARATUS AND METHOD OF ADJUSTING METERING FOR IMAGE PICKUP DEVICE

(75) Inventors: Hisayuki Watanabe, Iwaki (JP); Tsubasa Nomura, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 369 days.

(21) Appl. No.: 11/741,310

(22) Filed: Apr. 27, 2007

(65) Prior Publication Data

US 2007/0268118 A1    Nov. 22, 2007

(30) Foreign Application Priority Data

May 17, 2006    (JP)    ............... 2006-137393

(51) Int. Cl.
*B60Q 1/00*    (2006.01)
(52) U.S. Cl. ................. 340/435; 340/436; 340/937; 382/154; 382/148; 382/104
(58) Field of Classification Search ........... 340/435, 340/436, 907, 932.2, 937; 348/148, 584, 348/149, 104, 153, 118; 382/104, 284, 154, 382/148
See application file for complete search history.

(56) References Cited

U.S. PATENT DOCUMENTS

| | | | |
|---|---|---|---|
| 6,593,960 B1 | 7/2003 | Sugimoto et al. | |
| 6,677,986 B1* | 1/2004 | Pochmuller | 348/149 |
| 7,277,123 B1* | 10/2007 | Okamoto et al. | 348/148 |
| 7,457,456 B2* | 11/2008 | Miyoshi et al. | 382/154 |
| 2002/0034316 A1* | 3/2002 | Ishii et al. | 382/104 |
| 2002/0196340 A1* | 12/2002 | Kato et al. | 348/148 |
| 2003/0085999 A1* | 5/2003 | Okamoto et al. | 348/148 |
| 2003/0122930 A1* | 7/2003 | Schofield et al. | 348/148 |
| 2005/0192725 A1* | 9/2005 | Li | 701/36 |
| 2006/0018509 A1* | 1/2006 | Miyoshi et al. | 382/104 |
| 2006/0029256 A1* | 2/2006 | Miyoshi et al. | 382/104 |
| 2006/0029271 A1* | 2/2006 | Miyoshi et al. | 382/154 |
| 2006/0088190 A1* | 4/2006 | Chinomi | 382/104 |
| 2006/0115124 A1* | 6/2006 | Nobori et al. | 382/104 |

(Continued)

FOREIGN PATENT DOCUMENTS

EP    1115250 A1    7/2001

(Continued)

*Primary Examiner*—Davetta W Goins
*Assistant Examiner*—Hoi C Lau
(74) *Attorney, Agent, or Firm*—Brinks Hofer Gilson & Lione

(57) ABSTRACT

A surrounding image generating apparatus changes a viewpoint of images around a vehicle, taken by multiple image pickup devices mounted at different positions along the vehicle, to generate a surrounding image of the areas around the vehicle viewed from a virtual viewpoint located above the vehicle. The surrounding image generating apparatus includes a metering area determining unit determining at least one overlapping area in which the shooting areas of the image pickup devices are overlapped with each other to be a metering area for at least part of the image pickup devices; an exposure calculating unit focusing metering on the metering area for the at least part of the image pickup devices to calculate an appropriate exposure of each of the image pickup devices; and a surrounding image generating unit generating the surrounding image by using image signals generated in accordance with the calculated exposures.

16 Claims, 6 Drawing Sheets

U.S. PATENT DOCUMENTS

| | | | |
|---|---|---|---|
| 2006/0187314 A1* | 8/2006 | Fujie et al. | 348/222.1 |
| 2006/0192660 A1* | 8/2006 | Watanabe et al. | 340/435 |
| 2007/0153086 A1* | 7/2007 | Usui et al. | 348/153 |
| 2007/0263090 A1* | 11/2007 | Abe | 348/148 |
| 2007/0285282 A1* | 12/2007 | Nakayama et al. | 340/937 |
| 2007/0299572 A1* | 12/2007 | Okamoto et al. | 701/28 |
| 2007/0299584 A1* | 12/2007 | Okamoto et al. | 701/41 |
| 2008/0007618 A1* | 1/2008 | Yuasa | 348/118 |
| 2008/0024606 A1* | 1/2008 | Kawasaki | 348/148 |
| 2008/0170122 A1* | 7/2008 | Hongo et al. | 348/148 |
| 2008/0309517 A1* | 12/2008 | Saito | 340/937 |
| 2009/0128630 A1* | 5/2009 | Kanaoka et al. | 348/148 |

FOREIGN PATENT DOCUMENTS

JP  3286306  3/2002

* cited by examiner

FIG. 4
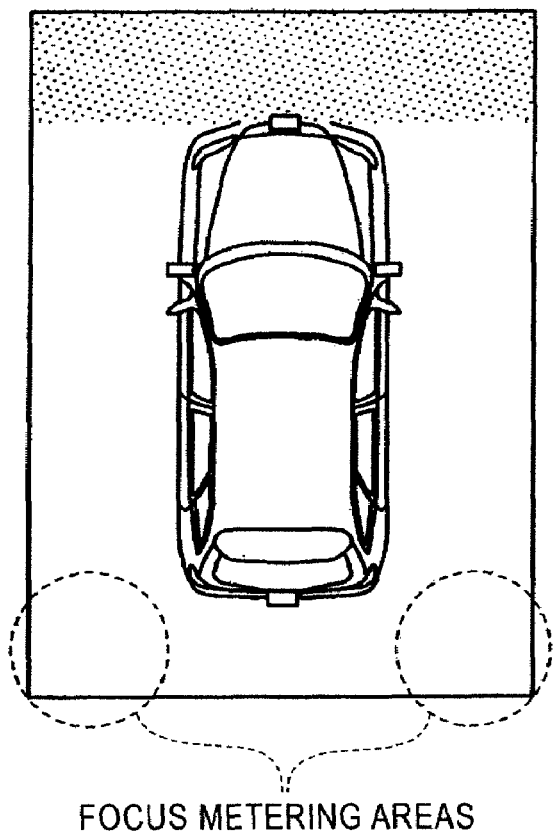
FOCUS METERING AREAS
FOCUS METERING AREAS
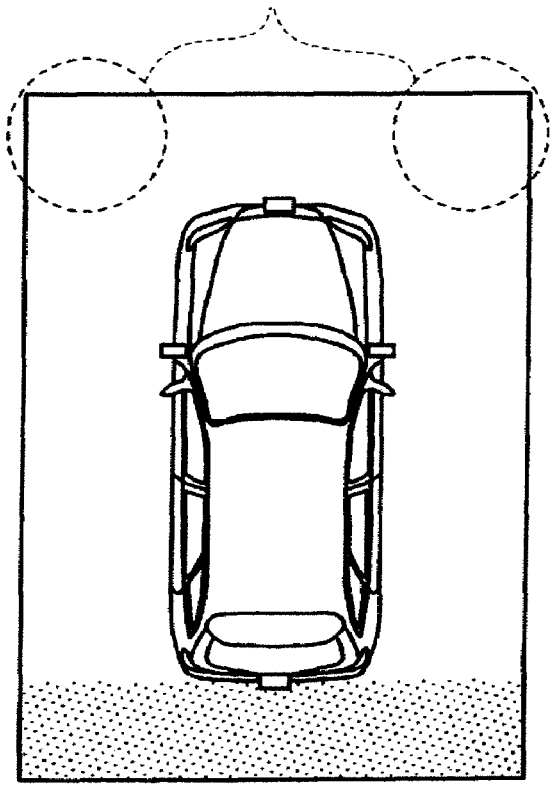
FIG. 5

SURROUNDING IMAGE GENERATING APPARATUS AND METHOD OF ADJUSTING METERING FOR IMAGE PICKUP DEVICE

RELATED APPLICATIONS

The present application claims priority to Japanese Patent Application Serial Number 2006-137393, filed on May 17, 2006, the entirety of which is hereby incorporated by reference.

BACKGROUND OF THE INVENTION

1. Field of the Invention

The present invention relates to surrounding image generating apparatuses and methods of adjusting metering for image pickup devices. Particularly, the present invention is preferably applied to a surrounding image generating apparatus that generates a surrounding image of a plurality of areas located around a vehicle, viewed from a virtual viewpoint located above the vehicle, and to a method of adjusting metering for multiple image pickup devices that are mounted along the perimeter of a vehicle to take images of the plurality of areas located around the vehicle.

2. Description of the Related Art

Hitherto, technologies are proposed in which multiple cameras are mounted along the perimeters of vehicles and images around the vehicles, taken by the multiple cameras, are subjected to viewpoint change to generate and display surrounding images viewed from virtual viewpoints above the vehicles. Drivers can confirm the surrounding images displayed in display devices of the vehicles to see the positional relationship between the vehicles and surrounding obstacles in order to drive the vehicles so as to prevent, for example, collision of the vehicles with the obstacles.

Generally, in systems adopting the above technologies, front cameras mounted on the fronts of the vehicles take images of "shooting areas" ahead of the vehicles. Left-side cameras mounted on the left sides of the vehicles take images of shooting areas on the left sides of the vehicles. Right-side cameras mounted on the right sides of the vehicles take images of shooting areas on the right sides of the vehicles. Rear cameras mounted on the backs of the vehicles take images of shooting areas behind the vehicles. Surrounding images around the vehicles are generated on the basis of the images ahead of the vehicles, on the left sides of the vehicles, on the right sides of the vehicles, and behind the vehicles taken by the corresponding cameras.

Since the multiple cameras are mounted at different positions along the perimeters of the vehicles in such systems, the brightness of subjects can vary depending on the shooting areas of the multiple cameras. For example, if the right side of a vehicle is irradiated with sunlight, the shooting area on the right side of the vehicle is in the sun and becomes bright while the shooting area on the left side of the vehicle is in the shade and becomes dark. While a vehicle moves backward for parking in a garage, the shooting area behind the vehicle is in the garage and becomes dark while the other shooting areas are outside the garage and become bright. In such cases, the images taken by the multiple cameras differ in luminance.

When multiple images differing in the luminance are combined to generate a surrounding image showing the entire perimeter of the vehicle, there is a problem in that breaks caused by the difference in the luminance can be seen between the images in different directions to provide an image with discomfort and poor visibility. It is difficult to combine the images taken by the multiple cameras in such a manner that any break caused by the difference in the luminance cannot be shown under various conditions differing in the position of the Sun, the weather, and the surrounding environment.

For example, Japanese Patent No. 3286306 discloses a technology of calculating a color of the pixel corresponding to a point P in the three-dimensional space, viewed from a virtual viewpoint above a vehicle, by using the colors of the point P in images that are taken by multiple cameras and that are associated with the point P in order to easily combine the images from all around the vehicle into one surrounding image so as to be close to the reality.

However, in the technology disclosed in Japanese Patent No. 3286306, there is a problem in that the color of the pixel corresponding to the point P cannot be appropriately adjusted to bring discomfort if the point P viewed from the virtual viewpoint is not associated with the images taken by the multiple cameras. In addition, there is also a problem in that it takes a significant time to perform the calculation because the color of each pixel must be calculated.

SUMMARY OF THE INVENTION

Accordingly, it is desirable to generate a surrounding image of the areas located around a vehicle, that a driver may view without discomfort or annoyance, with a smaller amount of calculation when the surrounding image is generated from images taken by multiple cameras mounted at different positions in the vehicle.

According to an embodiment of the present invention, a surrounding image generating apparatus changes a viewpoint of images of areas located around a vehicle, taken by a plurality of image pickup devices mounted at different positions along the vehicle, to generate a surrounding image around the vehicle viewed from a virtual viewpoint located above the vehicle. The surrounding image generating apparatus includes a focus and/or metering area determining unit operable to determine at least one overlapping area in which the shooting areas of the image pickup devices are overlapped with each other to be a focus and/or metering area for at least part of the image pickup devices; an exposure calculating unit operable to focus metering on the focus/metering area for at least part of the image pickup devices to calculate an appropriate exposure of each of the image pickup devices; and a surrounding image generating unit operable to generate the surrounding image by using image signals generated in accordance with the exposures calculated by the exposure calculating unit.

According to another embodiment of the present invention, a method of adjusting metering for a plurality of image pickup devices mounted at different positions in, along, and/or on a vehicle in order to take images around the vehicle in a surrounding image generating apparatus generating a surrounding image around the vehicle viewed from a virtual viewpoint located above the vehicle includes estimating a traveling direction of the vehicle; and determining at least one overlapping area to be a focus and/or metering area for each of the image pickup devices having the overlapping shooting areas in the estimated traveling direction.

According to yet another embodiment of the present invention, a method of adjusting metering for a plurality of image pickup devices mounted at different positions in, along, and/or on a vehicle in order to take images around the vehicle in a surrounding image generating apparatus generating a surrounding image around the vehicle viewed from a virtual viewpoint located above the vehicle includes detecting an obstacle in the vicinity of or other wise around the vehicle;

and determining at least one overlapping area to be a focus and/or metering area for each of the image pickup devices having the overlapping shooting areas in the direction where the obstacle is detected.

According to the present invention, the multiple images having the overlapping shooting areas in the focus/metering area have similar luminance values, so that breaks caused by the difference in luminance between the images can be almost hidden from view. The focus/metering area is set to an area where a driver should watch carefully, for example, the traveling direction of the vehicle or the direction where an obstacle exists. Consequently, it is possible to eliminate the annoyance or discomfort caused by the difference in luminance in the images in the traveling direction on which the driver should fix his/her eye during driving to improve the visibility of the areas at which the driver would look during driving. In addition, it is not necessary to perform complicated calculation, for example, calculation of a color for every pixel, thus generating a surrounding image around the vehicle without annoyance or discomfort for the driver with a smaller amount of calculation and/or processing required.

BRIEF DESCRIPTION OF THE DRAWINGS

FIG. 4 shows an exemplary surrounding image around the vehicle, generated by the surrounding image generating apparatus when the vehicle moves backward;

FIG. 5 shows an exemplary surrounding image around the vehicle, generated by the surrounding image generating apparatus when the vehicle moves forward;

DESCRIPTION OF THE PREFERRED EMBODIMENTS

Figure 1:
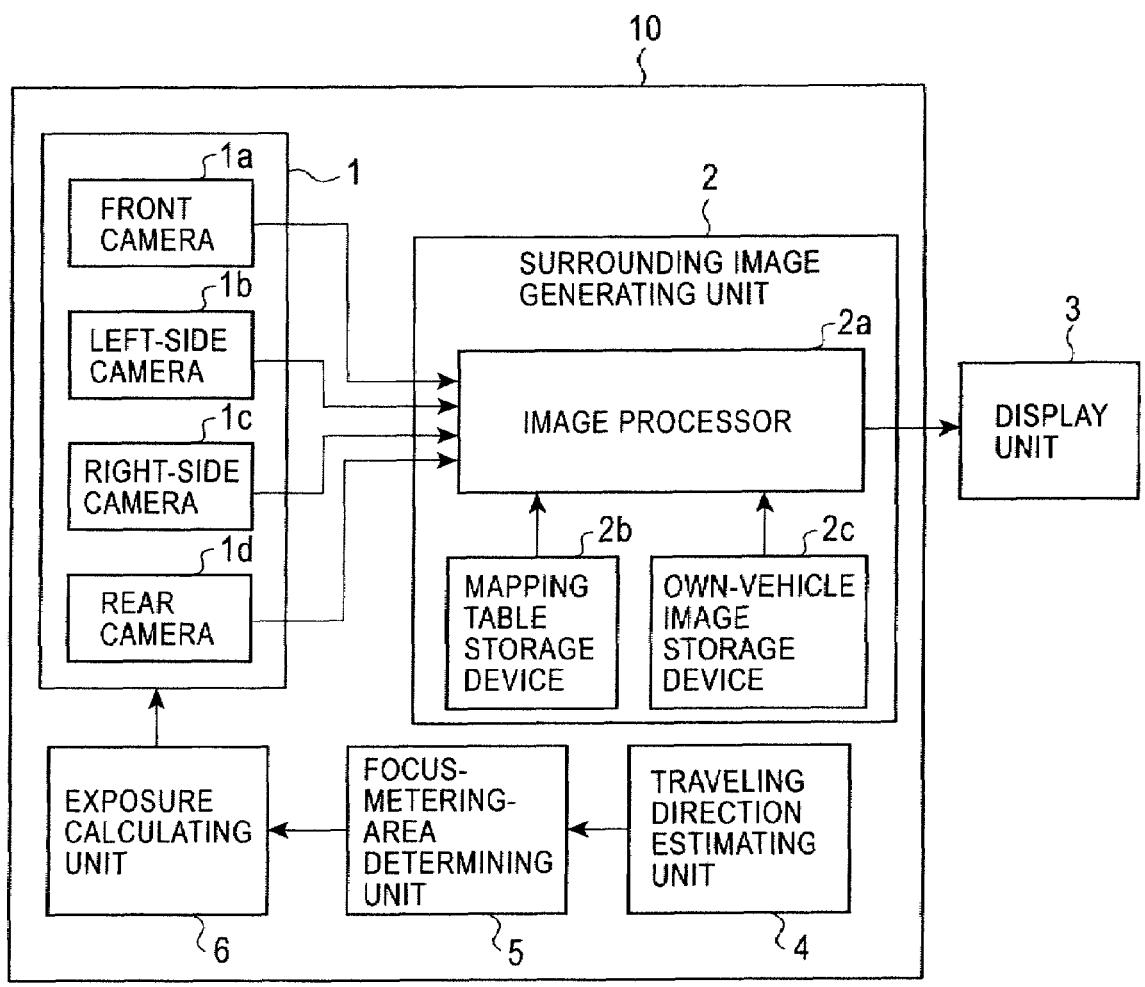
FIG. 1 is a block diagram showing an exemplary structure of a surrounding image generating apparatus for a vehicle.

Embodiments of the present invention will now be described with the attached drawings. FIG. 1 is a block diagram showing an example of the structure of a surrounding image generating apparatus 10 for a vehicle, according to an embodiment of the present invention. Referring to FIG. 1, the surrounding image generating apparatus 10 includes a plurality of image pickup devices 1 including a front camera 1a taking an image ahead of the vehicle, a left-side camera 1b taking an image on the left side of the vehicle, a right-side camera 1c taking an image on the right side of the vehicle, and a rear camera 1d taking an image behind the vehicle.

Figure 2:
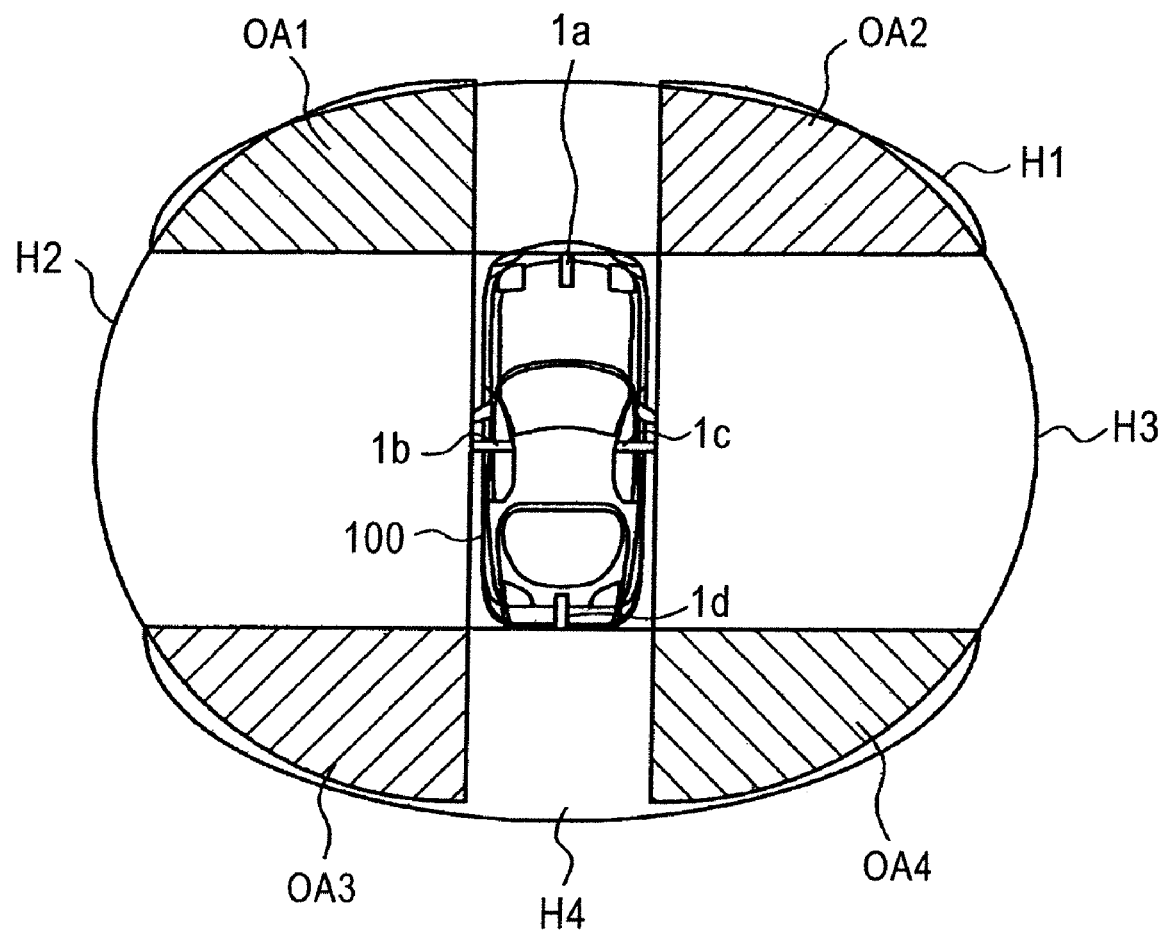
FIG. 2 shows an exemplary arrangement of cameras and corresponding shooting areas.

FIG. 2 shows arrangement of the front camera 1a, the left-side camera 1b, the right-side camera 1c, and the rear camera 1d and also illustrates examples of shooting areas. Referring to FIG. 2, the front camera 1a is mounted at the front of a vehicle 100 and takes an image of a front shooting area H1. The left-side camera 1b is mounted at the left side of the vehicle 100 and takes an image of a left-side shooting area H2. The right-side camera 1c is mounted at the right side of the vehicle 100 and takes an image of a right-side shooting area H3. The rear camera 1d is mounted at the back of the vehicle 100 and takes an image of a rear shooting area H4.

The front shooting area H1 is overlapped with the left-side shooting area H2 in a partial area OA1. The front shooting area H1 is overlapped with the right-side shooting area H3 in a partial area OA2. The rear shooting area H4 is overlapped with the left-side shooting area H2 in a partial area OA3. The rear shooting area H4 is overlapped with the right-side shooting area H3 in a partial area OA4.

Referring back to FIG. 1, the surrounding image generating apparatus 10 also includes a surrounding image generating unit 2. The surrounding image generating unit 2 includes an image processor 2a, a mapping table storage device 2b, and an own-vehicle image storage device 2c. The image processor 2a receives images taken by the cameras 1a to 1d to generate a background image of the vehicle 100 when the vicinity of the vehicle 100 is viewed from above, in accordance with correspondence information stored in the mapping table storage device 2b.

The background image is generated by combining a front surrounding image, a left-side surrounding image, a right-side surrounding image, and a rear surrounding image. The front surrounding image is generated by changing the viewpoint of an image taken by the front camera 1a. The left-side surrounding image is generated by changing the viewpoint of an image taken by the left-side camera 1b. The right-side surrounding image is generated by changing the viewpoint of an image taken by the right-side camera 1c. The rear surrounding image is generated by changing the viewpoint of an image taken by the rear camera 1d.

The mapping table storage device 2b includes a table in which the correspondence between pixel data concerning an image taken by each of the cameras 1a to 1d and pixel data concerning the background image when the vicinity of the vehicle 100 is viewed from a virtual viewpoint located above the vehicle 100 is described. The correspondence information indicating which pixel in the taken image corresponds to which pixel in the background image is described in this table. The own-vehicle image storage device 2c stores an image of its own vehicle, indicating the form of the vehicle 100 viewed from above. The image in the own-vehicle image storage device 2c is read out by the image processor 2a. The image processor 2a superimposes the image of its own vehicle on the approximate center of the background image described above to generate a surrounding image of the vehicle 100. The surrounding image generating apparatus 10 is provided with a display unit 3 that displays the surrounding image generated by the image processor 2a.

The surrounding image generating apparatus 10 further includes a traveling direction estimating unit 4 that estimates a traveling direction of the vehicle 100. The estimation of the traveling direction is based on, for example, a gear position. In other words, the traveling direction estimating unit 4 determines which position the transmission of the vehicle 100 is shifted into and estimates the traveling direction of the vehicle 100 on the basis of the determination result. Specifically, the traveling direction estimating unit 4 estimates that the vehicle 100 will move forward if the traveling direction estimating unit 4 detects that the transmission is shifted into drive (other than neutral, parking, and reverse). The traveling direction estimating unit 4 estimates that the vehicle 100 will move backward if the traveling direction estimating unit 4 detects that the transmission is shifted into reverse.

The estimation of the traveling direction of the vehicle 100 is not limited to the above method. For example, the traveling direction of the vehicle 100 may be estimated on the basis of which direction indicator, such as a turn signal or audible reverse indicator, is operating. In this case, the traveling direction estimating unit 4 determines which direction indicator is operating and estimates the traveling direction of the vehicle 100 on the basis of the determination result. Specifically, the traveling direction estimating unit 4 estimates that the vehicle 100 will move forward right if the traveling direction estimating unit 4 detects that a right-turn direction indicator is operating. The traveling direction estimating unit 4 estimates that the vehicle 100 will move forward left if the traveling direction estimating unit 4 detects that a left-turn direction indicator is operating.

If no direction indicator is operating when the traveling direction of the vehicle 100 is estimated on the basis of which direction indicator is operating, it is not possible to estimate the traveling direction of the vehicle 100. Accordingly, the estimation of the traveling direction on the basis of which direction indicator is operating is preferably performed as an addition to the estimation of the traveling direction on the basis of the gear position.

The surrounding image generating apparatus 10 further includes a focus-metering-area determining unit 5. The focus-metering-area or metering area determining unit 5 determines at least one overlapping area in which the shooting areas of two cameras, among the cameras 1a to 1d, are overlapped with each other to be a focus metering area for the corresponding cameras.

It should be noted that a camera may have one or more metering zones or areas, and an internal light and/or exposure meter operable to measure the light in a given area. Center-weighted metering may measure the light from an entire frame, but places more emphasis on a circular area in the center of the frame. On the other hand, spot metering may take a reading from a focus or focused area/point. Newer cameras may have more complex light meters that allow them to read the amount of light from many places within the frame. For example, multi-pattern, matrix, or segmented metering may be employed. These types of systems work by dividing the viewing area into a set pattern or grid of several segments. The meter within a camera may read each segment and make a comparative analysis of things such as the size of a subject and/or the brightness of each zone. The term "focus metering area" used herein may refer to a metering area, metering zone, focus area/point, focused metering area, area of interest, area for which to adjust the metering for, or other metering area.

Specifically, the focus-metering-area determining unit 5 determines at least one overlapping area between the shooting areas of any two cameras, among the cameras 1a to 1d, in the traveling direction estimated by the traveling direction estimating unit 4 to be the focus metering area for the corresponding cameras. All the overlapping areas may be the focus metering areas or part of the overlapping areas may be the focus metering areas. Alternatively, an area broader than the area including all the overlapping areas by a predetermined amount may be determined to be the focus metering area.

For example, it is assumed that the traveling direction estimating unit 4 estimates that the vehicle 100 will move forward. In the estimated forward direction, the front shooting area H1 is overlapped with the left-side shooting area H2 in the partial area OA1, and the front shooting area H1 is overlapped with the right-side shooting area H3 in the partial area OA2. Accordingly, the three cameras including the front camera 1a, the left-side camera 1b, and the right-side camera 1c have the overlapping shooting areas in front of the vehicle 100.

In this case, the focus-metering-area determining unit 5 determines the overlapping areas OA1 in which the front shooting area H1 is overlapped with the left-side shooting area H2 and the overlapping area OA2 in which the front shooting area H1 is overlapped with the right-side shooting area H3 to be the focus metering areas for the front camera 1a, the left-side camera 1b, and the right-side camera 1c. Specifically, for the front camera 1a, the overlapping area OA1 with the left-side shooting area H2 and the overlapping area OA2 with the right-side shooting area H3, in the front shooting area H1, are determined to be the focus metering areas. For the left-side camera 1b, the overlapping area OA1 with the front shooting area H1, in the left-side shooting area H2, is determined to be the focus metering area. For the right-side camera 1c, the overlapping area OA2 with the front shooting area H1, in the right-side shooting area H3, is determined to be the focus metering area.

For instance, it is assumed that the traveling direction estimating unit 4 estimates that the vehicle 100 will move forward right. In the estimated forward right direction, the front shooting area H1 is overlapped with the right-side shooting area H3 in the partial area OA2. Accordingly, the two cameras including the front camera 1a and the right-side camera 1c have the overlapping shooting areas in the forward right direction of the vehicle 100.

In this case, the focus-metering-area determining unit 5 determines the overlapping area OA2 in which the front shooting area H1 is overlapped with the right-side shooting area H3 to be the focus metering area for the front camera 1a and the right-side camera 1c. Specifically, for the front camera 1a, the overlapping area OA2 with the right-side shooting area H3, in the front shooting area H1, is determined to be the focus metering area. For the right-side camera 1c, the overlapping area OA2 with the front shooting area H1, in the right-side shooting area H3, is determined to be the focus metering area.

The surrounding image generating apparatus 10 further includes an exposure calculating unit 6. The exposure calculating unit 6 calculates an appropriate exposure for each of the cameras 1a to 1d. For the cameras for which the focus metering areas are determined by the focus-metering-area determining unit 5, the metering is focused on the determined focus metering areas to calculate appropriate exposures. Specifically, a weight larger than that of an imaging signal yielded from an area that is not the focus metering area is set to an imaging signal yielded from the focus metering area to calculate an appropriate exposure on the basis of the weighted imaging signal. In contrast, for the cameras for which the focus metering areas are not determined by the focus-metering-area determining unit 5, a metering method determined in advance is used to calculate appropriate exposures. The metering method determined in advance may be multi-pattern, segmented, center-weighted, spot, or another type of metering.

In the examples described above, the two overlapping areas OA1 and OA2 are determined to be the focus metering areas for the front camera 1a for which the metering may be specifically adjusted for. The exposure calculating unit 6 focuses the metering on the two focus metering areas OA1 and OA2, in the front shooting area H1 of the front camera 1a, to calculate an exposure of the front camera 1a. In the examples described above, the overlapping area OA1 is determined to be the focus metering area for the left-side camera 1b. The exposure calculating unit 6 focuses the metering on the focus metering area OA1, in the left-side shooting area H2 of the left-side camera 1b, to calculate an exposure of the left-side camera 1b.

In the examples described above, the overlapping area OA2 is determined to be the focus metering area for the right-side camera 1c. The exposure calculating unit 6 focuses the metering on the focus metering area OA2, in the right-side shooting area H3 of the right-side camera 1c, to calculate an exposure of the right-side camera 1c. The exposure calculating unit 6 uses the metering method determined in advance for the rear camera 1d for which the focus metering area is not set to calculate an appropriate exposure of the rear camera 1d.

The exposure calculating unit 6 adjusts the iris diaphragms of the cameras 1a to 1d so as to yield the calculated exposures. The surrounding image generating unit 2 generates a surrounding image in accordance with the exposures calculated by the exposure calculating unit 6 by using image signals generated in the shooting by the cameras 1a to 1d.

Figure 3:
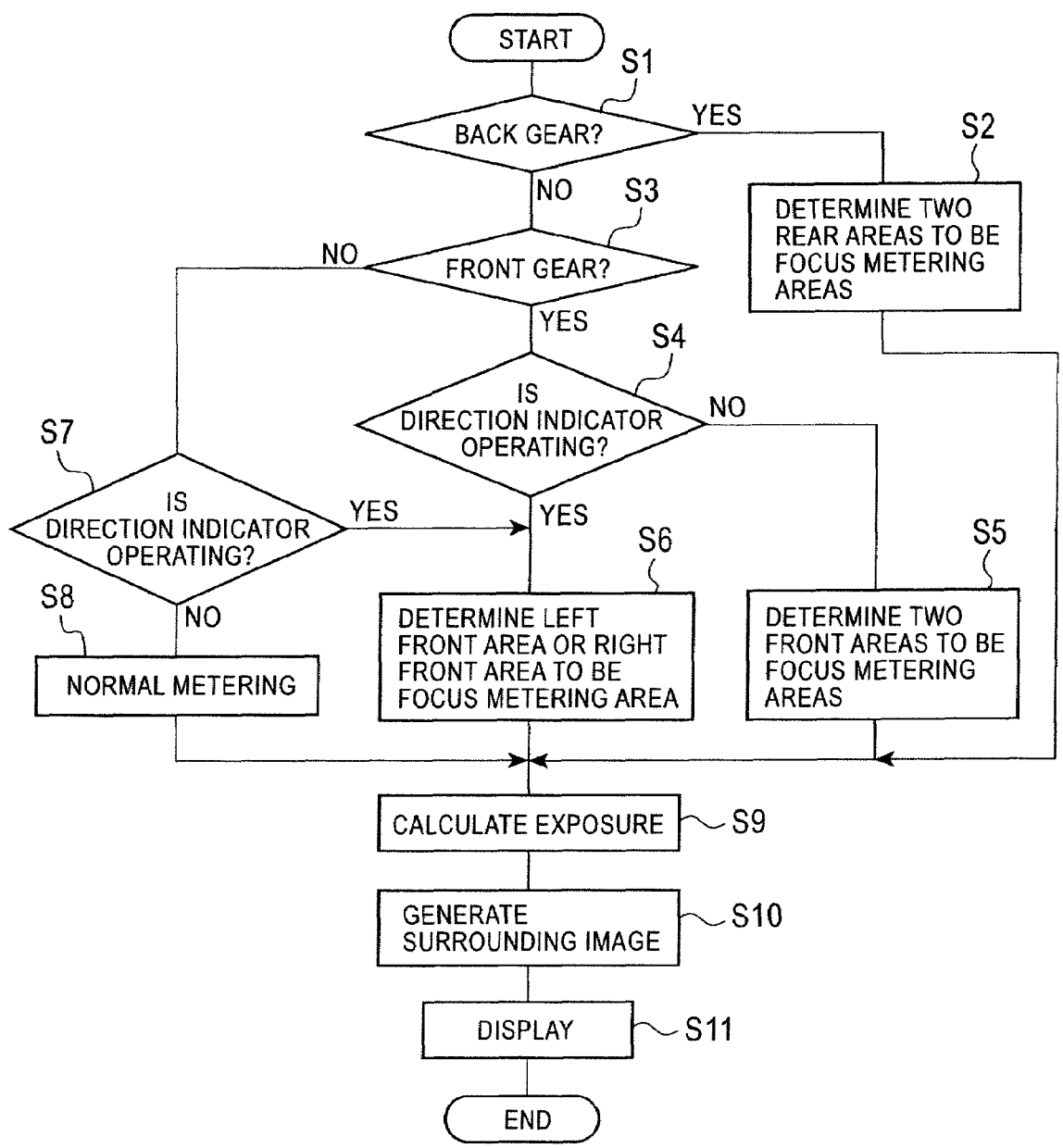
FIG. 3 is a flowchart showing an exemplary operation of the surrounding image generating apparatus.

FIG. 3 is a flowchart showing an example of an operation of the surrounding image generating apparatus 10 having the above structure, according to the embodiment of the present invention.

Referring to FIG. 3, in Step S1, the traveling direction estimating unit 4 determines whether the transmission is shifted into reverse. If the traveling direction estimating unit 4 determines that the transmission is shifted into reverse, then in Step S2, the focus-metering-area determining unit 5 determines the overlapping area OA3 between the left-side shooting area H2 and the rear shooting area H4 and the overlapping area OA4 between the right-side shooting area H3 and the rear shooting area H4 to be the focus metering areas for the left-side camera 1b, the right-side camera 1c, and the rear camera 1d for which the metering of each camera may be specifically adjusted for.

Specifically, for the rear camera 1d, the focus-metering-area determining unit 5 determines the overlapping area OA3 between the rear shooting area H4 and the left-side shooting area H2 and the overlapping area OA4 between the rear shooting area H4 and the right-side shooting area H3 to be the focus metering areas. For the left-side camera 1b, the focus-metering-area determining unit 5 determines the overlapping area OA3 between the left-side shooting area H2 and the rear shooting area H4 to be the focus metering area. For the right-side camera 1c, the focus-metering-area determining unit 5 determines the overlapping area OA4 between the right-side shooting area H3 and the rear shooting area H4 to be the focus metering area. For the remaining front camera 1a, the focus-metering-area determining unit 5 uses the metering method determined in advance to determine a metering area.

If the traveling direction estimating unit 4 determines in Step S1 that the transmission is not shifted into reverse, then in Step S3, the traveling direction estimating unit 4 determines whether the transmission is shifted into drive. If the traveling direction estimating unit 4 determines that the transmission is shifted into drive, then in Step S4, the traveling direction estimating unit 4 determines whether the direction indicator is operating. If the traveling direction estimating unit 4 determines that the direction indicator is not operating, then in Step S5, the focus-metering-area determining unit 5 determines the overlapping area OA1 between the front shooting area H1 and the left-side shooting area H2 and the overlapping area OA2 between the front shooting area H1 and the right-side shooting area H3 to be the focus metering areas for the front camera 1a, the left-side camera 1b, and the right-side camera 1c for which the metering of each camera may adjusted for.

Specifically, for the front camera 1a, the focus-metering-area determining unit 5 determines the overlapping area OA1 between the front shooting area H1 and the left-side shooting area H2 and the overlapping area OA2 between the front shooting area H1 and the right-side shooting area H3 to be the focus metering areas. For the left-side camera 1b, the focus-metering-area determining unit 5 determines the overlapping area OA1 between the left-side shooting area H2 and the front shooting area H1 to be the focus metering area. For the right-side camera 1c, the focus-metering-area determining unit 5 determines the overlapping area OA2 between the right-side shooting area H3 and the front shooting area H1 to be the focus metering area. For the rear camera 1d, the focus-metering-area determining unit 5 uses the metering method determined in advance to determine the metering area for which to adjust the metering.

If the traveling direction estimating unit 4 determines in Step S4 that the direction indicator is operating, then in Step S6, the focus-metering-area determining unit 5 determines the overlapping area OA1 between the front shooting area H1 and the left-side shooting area H2 or the overlapping area OA2 between the front shooting area H1 and the right-side shooting area H3, which is in the direction indicated by the direction indicator, to be the focus metering area. Specifically, if the left turning is indicated, the focus-metering-area determining unit 5 determines the overlapping area OA1 to be the focus metering area for the front camera 1a and the left-side camera 1b. In this case, for the right-side camera 1c and the rear camera 1d, the focus-metering-area determining unit 5 uses the metering method determined in advance to determine the metering area. If the right turning is indicated, the focus-metering-area determining unit 5 determines the overlapping area OA2 to be the focus metering area for the front camera 1a and the right-side camera 1c. In this case, for the left-side camera 1b and the rear camera 1d, the focus-metering-area determining unit 5 uses the metering method determined in advance to determine the metering area.

If the transmission is not shifted into reverse in Step S1 and is not shifted into drive in Step S3 (is shifted into neutral or parking), then in Step S7, the traveling direction estimating unit 4 determines whether the direction indicator is operating. If the traveling direction estimating unit 4 determines that the direction indicator is not operating, then in Step S8, the focus-metering-area determining unit 5 uses the metering method determined in advance to determine the metering area for each of the cameras 1a to 1d. If the traveling direction estimating unit 4 determines in Step S7 that the direction indicator is operating, then in Step S6, the focus-metering-area determining unit 5 determines the forward left overlapping area OA1 or the forward right overlapping area OA2, which is in the direction indicated by the direction indicator, to be the focus metering area.

After the focus-metering-area determining unit 5 determines at least one focus metering area in Step S2, S5, S6, or S8, then in Step S9, the exposure calculating unit 6 calculates an appropriate exposure of each of the cameras a1 to 1d on the basis of the imaging signals yielded from the focus metering areas determined by the focus-metering-area determining unit 5. The exposure calculating unit 6, then, controls each of the cameras 1a to 1d so as to yield the calculated appropriate exposure. The exposure calculating unit 6 sets a weight larger than that of the imaging signal yielded from an area that is not the focus metering area to the imaging signal yielded from the focus metering area to calculate an appropriate exposure on the basis of the weighted imaging signal.

In Step S10, the surrounding image generating unit 2 generates a surrounding image around the vehicle in accordance with the exposures calculated by the exposure calculating unit 6 by using the image signals generated in the shooting by the cameras 1a to 1d. In Step S11, the display unit 3 displays the surrounding image generated by the surrounding image generating unit 2.

As described above in detail, according to the embodiment of the present invention, the estimated traveling direction of the vehicle 100 is detected and at least one overlapping shooting area in the detected traveling direction is determined to be the focus metering area. The metering is focused on the overlapping area to calculate the appropriate exposures of the cameras 1a to 1d. Accordingly, the multiple images having the overlapping shooting areas in the focus metering area have similar luminance values, so that breaks caused by the difference in luminance between the images can be almost hidden from view. Consequently, it is possible to eliminate the discomfort caused by the difference in luminance in the images in the traveling direction on which the driver should fix his/her eye during driving to improve the visibility of the areas at which the driver would look during driving.

For example, if the two rear overlapping areas OA3 and OA4 are determined to be the focus metering areas in Step S2 in FIG. 3, the images taken by the left-side camera 1b, the right-side camera 1c, and the rear camera 1d, which have the overlapping shooting areas in the focus metering areas, have similar luminance values. As a result, as shown in FIG. 4, the breaks caused by the difference in luminance can be almost hidden from view in the joints between the rear images.

If the two front overlapping areas OA1 and OA2 are determined to be the focus metering areas in Step S5 in FIG. 3, the images taken by the front camera 1a, the left-side camera 1b, and the right-side camera 1c, which have the overlapping shooting areas in the focus metering areas, have similar luminance values. As a result, as shown in FIG. 5, the breaks caused by the difference in luminance can be almost hidden from view in the joints between the front images.

If the front overlapping area OA1 or OA2 is determined to be the focus metering area in Step S6 in FIG. 3, the images taken by the front camera 1a and the left-side camera 1b, which have the overlapping shooting areas in the focus metering area, have similar luminance values, or the images taken by the front camera 1a and the right-side camera 1c, which have the overlapping shooting areas in the focus metering area, have similar luminance values. As a result, the breaks caused by the difference in luminance may be almost hidden from view in the joints between the front left images or between the front right images.

According to the embodiment of the present invention, there is no need to calculate a color for every pixel and it may be sufficient to simply determine the focus metering area. Consequently, it may not necessary to perform complicated calculation with higher load, thus more easily generating a surrounding image around the vehicle without discomfort or annoyance for the driver with a smaller amount of calculation and/or processing.

Figure 6:
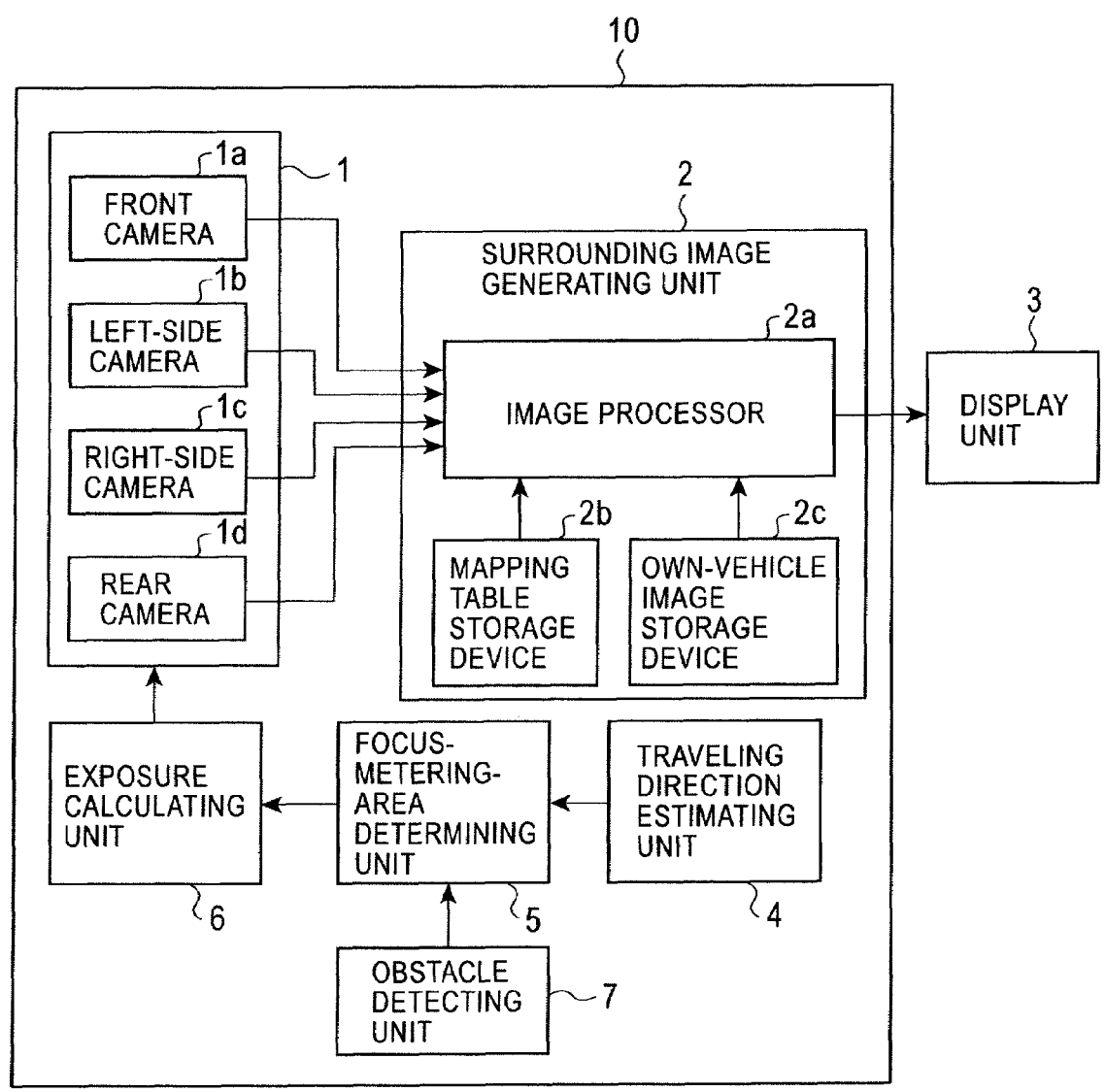
FIG. 6 is a block diagram showing an exemplary structure of a surrounding image generating apparatus for a vehicle.

FIG. 6 is a block diagram showing an example of the structure of a surrounding image generating apparatus 10 according to another embodiment of the present invention. The same reference numerals are used in FIG. 6 to identify the same components shown in FIG. 1. A detailed description of such components is omitted herein. The surrounding image generating apparatus 10 in FIG. 6 includes an obstacle detecting unit 7, in addition to the components shown in FIG. 1.

The obstacle detecting unit 7 detects an obstacle around the vehicle 100. For example, the obstacle detecting unit 7 may be provided with a radar device. In this case, the obstacle detecting unit 7 observes a wave, such as an electromagnetic wave, reflected from the radar device to detect the presence of an obstacle and the direction to where the obstacle exists. The obstacle detecting unit 7 may analyze the images taken by the cameras 1a to 1d to detect the presence of an obstacle and the direction to where the obstacle exists. The methods of detecting an obstacle are only examples and the obstacle detecting unit 7 is not limited to adoption of the above methods.

In example shown in FIG. 6, the focus-metering-area determining unit 5 determines the overlapping areas of the camera having the overlapping shooting area in the direction toward where the obstacle is detected by the obstacle detecting unit 7, among cameras having overlapping shooting areas in the traveling direction estimated by the traveling direction estimating unit 4, to be the focus metering areas.

For example, if the traveling direction estimating unit 4 estimates that the vehicle 100 will move backward, the left-side camera 1b, the right-side camera 1c, and the rear camera 1d have the respective shooting areas in the two rear overlapping areas OA3 and OA4. If the obstacle detecting unit 7 detects an obstacle in a backward right direction when the vehicle 100 moves backward, the focus-metering-area determining unit 5 determines the overlapping area OA4 to be the focus metering area for the right-side camera 1c and the rear camera 1d having the respective shooting areas in the backward right overlapping area OA4, among the left-side camera 1b, the right-side camera 1c, and the rear camera 1d. For the front camera 1a and the left-side camera 1b, the focus-metering-area determining unit 5 uses the metering method determined in advance to determine the metering area.

Although both the traveling direction estimating unit 4 and the obstacle detecting unit 7 are used in the above example, only the obstacle detecting unit 7 may be used in one aspect. However, when the focus metering area is determined on the basis of only the presence of an obstacle, it is not possible to determine the focus metering area if no obstacle is detected. Accordingly, the determination of the focus metering area on the basis of the presence of an obstacle is preferably performed as an addition to the determination of the focus metering area on the basis of the traveling direction.

Figure 7:
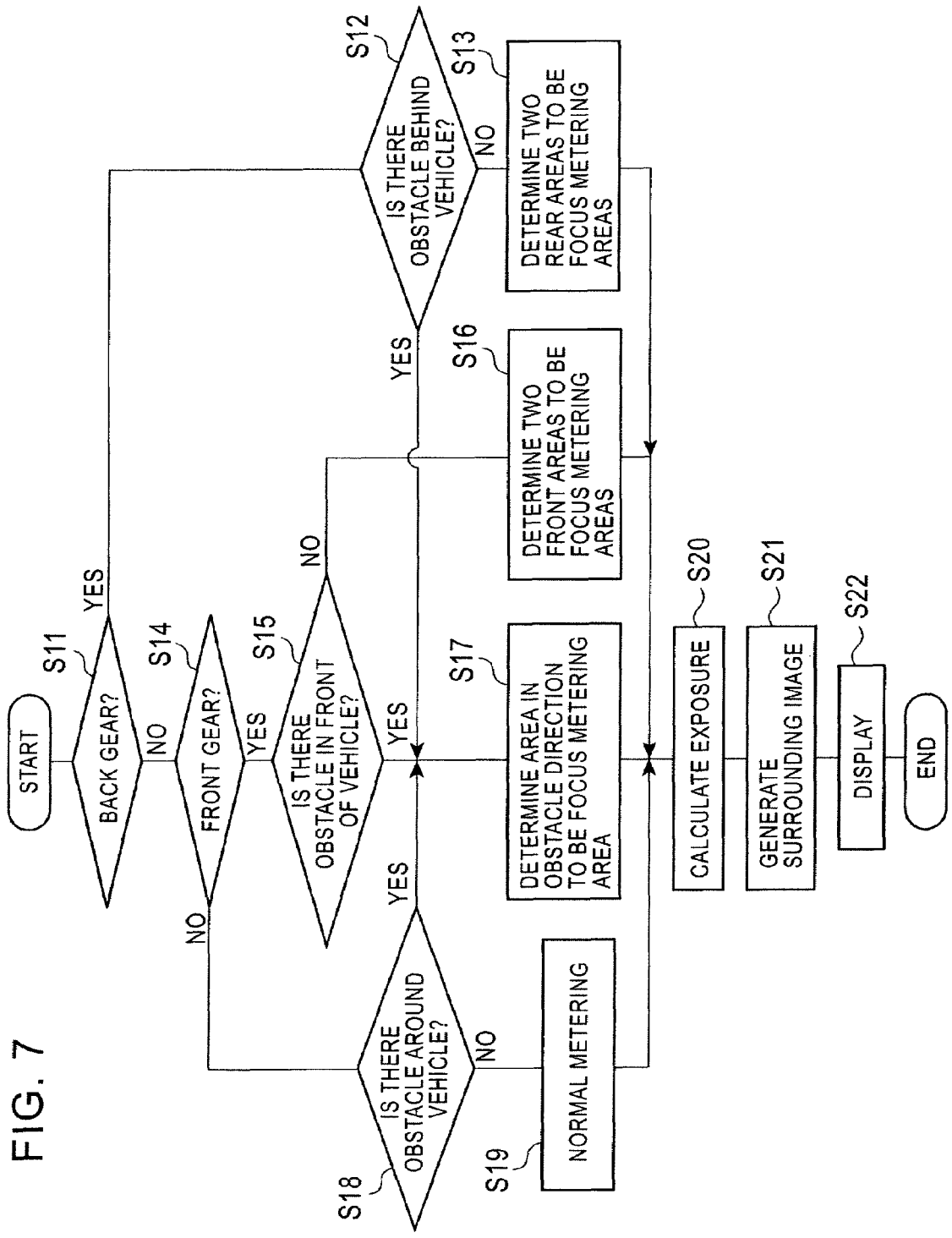
FIG. 7 is a flowchart showing an exemplary operation of the surrounding image generating apparatus shown in FIG. 6.

FIG. 7 is a flowchart showing an example of an operation of the surrounding image generating apparatus 10 having the structure shown in FIG. 6. Referring to FIG. 7, in Step S11, the traveling direction estimating unit 4 determines whether the transmission is shifted into reverse. If the traveling direction estimating unit 4 determines that the transmission is shifted into reverse, then in Step S12, the obstacle detecting unit 7 detects whether an obstacle exists behind the vehicle 100.

If the obstacle detecting unit 7 detects that no obstacle exists behind the vehicle 100, then in Step S13, the focus-metering-area determining unit 5 determines the overlapping area OA3 between the left-side shooting area H2 and the rear shooting area H4 and the overlapping area OA4 between the right-side shooting area H3 and the rear shooting area H4 to be the focus metering areas for the left-side camera 1b, the right-side camera 1c, and the rear camera 1d for which to adjust the metering for. If the obstacle detecting unit 7 detects in Step S12 that an obstacle exists behind the vehicle 100, then in Step S17, the focus-metering-area determining unit 5 determines the overlapping area OA3 or OA4, which is in the direction where the obstacle exists, to be the focus metering area.

If the traveling direction estimating unit 4 determines in Step S11 that the transmission is not shifted into reverse, then in Step S14, the traveling direction estimating unit 4 determines whether the transmission is shifted into drive. If the traveling direction estimating unit 4 determines that the transmission is shifted into drive, then in Step S15, the obstacle detecting unit 7 detects whether an obstacle exists ahead of the vehicle 100.

If the obstacle detecting unit 7 detects that no obstacle exists ahead of the vehicle 100, then in Step S16, the focus-metering-area determining unit 5 determines the overlapping area OA1 between the front shooting area H1 and the left-side shooting area H2 and the overlapping area OA2 between the front shooting area H1 and the right-side shooting area H3 to be the focus metering areas for the front camera 1a, the left-side camera 1b, and the right-side camera 1c for which to adjust the metering for. If the obstacle detecting unit 7 detects in Step S15 that an obstacle exists ahead of the vehicle 100, then in Step S17, the focus-metering-area determining unit 5 determines the overlapping area OA1 or OA2, which is in the direction where the obstacle exists, to be the focus metering area.

If the transmission is not shifted into reverse in Step S11 and is not shifted into drive in Step S14, then in Step S18, the obstacle detecting unit 7 detects whether an obstacle exists around the vehicle 100. If the obstacle detecting unit 7 detects that no obstacle exists around the vehicle 100, then in Step S19, the focus-metering-area determining unit 5 uses the metering method determined in advance to determine the metering areas for the cameras 1a to 1d. If the obstacle detecting unit 7 detects that an obstacle exists around the vehicle 100, then in Step S17, the focus-metering-area determining unit 5 determines the overlapping area which is in the direction where the obstacle exists to be the focus metering area.

After the focus-metering-area determining unit 5 determines at least one focus metering area in Step S13, S16, S17, or S19, then in Step S20, the exposure calculating unit 6 calculates an appropriate exposure of each of the cameras 1a to 1d on the basis of the imaging signals yielded from the focus metering areas determined by the focus-metering-area determining unit 5. The exposure calculating unit 6, then, controls each of the cameras 1a to 1d so as to yield the calculated appropriate exposure. The exposure calculating unit 6 sets a weight larger than that of the imaging signal yielded from an area that is not the focus metering area to the imaging signal yielded from the focus metering area to calculate an appropriate exposure on the basis of the weighted imaging signal. Alternatively, the exposure calculating unit 6 may calculate an appropriate exposure of each of the cameras 1a to 1d on the basis of other information associated with the focus metering areas determined.

In Step S21, the surrounding image generating unit 2 generates a surrounding image around the vehicle in accordance with the exposures calculated by the exposure calculating unit 6 by using the image signals generated in the shooting by the cameras 1a to 1d. In Step S22, the display unit 3 displays the surrounding image generated by the surrounding image generating unit 2.

In the surrounding image generating apparatus 10 having the structure shown in FIG. 6, it is possible to eliminate the discomfort caused by the difference in luminance in the images in the direction on which the driver should fix his/her attention to during driving, for example, in the direction where an obstacle exists, to improve the visibility of the areas at which the driver would look during driving.

Although the metering is focused on the overlapping shooting areas in the above embodiments, the present invention is not limited to this metering method. For example, spot metering in which the metering is performed only for overlapping shooting areas may be adopted. The spot metering corresponds to setting the weights of the areas other than the focus metering areas to zero.

Although the automatic exposure adjustment in which the exposure calculating unit 6 calculates the appropriate exposures by using the imaging signals from the focus metering areas determined by the focus-metering-area determining unit 5 is adopted in the above embodiments, the present invention is not limited to this. For example, the present invention is applicable to automatic white balance adjustment in which white balance adjustment is performed by using the imaging signals from the focus metering areas determined by the focus-metering-area determining unit 5.

It will be further understood by those skilled in the art that the foregoing description is of the preferred embodiments of the present invention and that various changes and modifications may be made to the invention without departing from the spirit and scope thereof. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A surrounding image generating apparatus that changes a viewpoint of images taken by a plurality of image pickup devices mounted at different positions along a vehicle to generate a surrounding image showing areas around the vehicle as viewed from a virtual viewpoint located above the vehicle, the surrounding image generating apparatus comprising:
   a metering area determining unit operable to determine at least one overlapping area in which a shooting area of at least two of the plurality of image pickup devices are overlapped with each other, the at least one overlapping area being set as a metering area that facilitates calculation of an appropriate exposure for both of the at least two of the plurality of image pickup devices;
   an exposure calculating unit operable to calculate an appropriate exposure for both of the at least two of the plurality of image pickup devices on the basis of imaging signals associated with the metering area; and
   a surrounding image generating unit operable to generate the surrounding image, wherein focusing of the metering on the at least one overlapping area to facilitate the calculation of the appropriate exposures for both of the at least two of the plurality of image pickup devices results in acquiring images including the at least one overlapping area taken from both of the at least two of the plurality of image pickup devices having similar luminance values in the at least one overlapping area from which the surrounding image is generated and that difference in luminance of the at least one overlapping area shown in the images acquired from both of the at least two of the plurality of image pickup devices is alleviated without pixel compensation.

2. The surrounding image generating apparatus according to claim 1, further comprising:
   a traveling direction estimating unit that estimates a traveling direction of the vehicle,
   wherein the metering area determining unit determines the at least one overlapping area to be in the traveling direction.

3. The surrounding image generating apparatus according to claim 2, wherein the traveling direction estimating unit estimates the traveling direction on the basis of a gear position of the vehicle.

4. The surrounding image generating apparatus according to claim 2, wherein the traveling direction estimating unit estimates the traveling direction on the basis of a gear position of the vehicle and which direction indicator is operating.

5. The surrounding image generating apparatus according to claim 1, further comprising:
   an obstacle detecting unit that detects an obstacle in the vicinity of the vehicle, wherein the metering area determining unit determines the at least one overlapping area to be in the direction toward where the obstacle is detected.

6. The surrounding image generating apparatus according to claim 5, further comprising:
a traveling direction estimating unit that estimates a traveling direction of the vehicle,
wherein the metering area determining unit determines the at least one overlapping area to also be in the traveling direction.

7. The surrounding image generating apparatus according to claim 1, wherein the metering area determining unit determines an area broader than the at least one overlapping area by a predetermined amount to be the metering area.

8. A method of adjusting metering for a plurality of image pickup devices mounted at different positions in and/or on a vehicle in order to generate a surrounding image showing areas around the vehicle as viewed from a virtual viewpoint located above the vehicle, the method comprising:
estimating a traveling direction of the vehicle;
determining at least one overlapping area for each of the plurality of image pickup devices, the at least one overlapping area comprising an overlapping shooting area in the estimated traveling direction;
focusing metering for each of the plurality of image pickup devices to the at least one overlapping area to facilitate calculation of an appropriate exposure for each of the plurality of image pickup devices; and
acquiring images of the at least one overlapping area from each of the plurality of image pickup devices with the appropriate exposure such that images of the at least one overlapping area taken from different image pickup devices have a similar luminance value and that difference in luminance of the at least one overlapping area shown in surrounding images showing the at least one overlapping area taken from different image pickup devices is alleviated without pixel compensation.

9. The method of adjusting metering according to claim 8, wherein the traveling direction is estimated on the basis of a gear position of the vehicle.

10. The method of adjusting metering according to claim 8, wherein the traveling direction is estimated on the basis of a gear position of the vehicle and which direction indicator is operating.

11. The method of adjusting metering according to claim 8, the method further comprising:
detecting an obstacle in the vicinity of the vehicle,
wherein the overlapping shooting area is also in the direction toward where the obstacle is detected.

12. The method of adjusting metering according to claim 8, wherein an area broader than the at least one overlapping area by a predetermined amount is determined to be the metering area.

13. A method of adjusting metering for a plurality of image pickup devices mounted at different positions along a vehicle in order to generate a surrounding image of the vehicle as viewed from a virtual viewpoint located above the vehicle, the method comprising:
detecting an obstacle in the vicinity of the vehicle;
determining an overlapping area for two image pickup devices, the overlapping area comprising an overlapping shooting area in the direction toward where the obstacle is detected; and
automatically focusing metering for both of the two image pickup devices on the overlapping area to facilitate the calculation of an appropriate exposure for both of the two image pickup devices on the basis of imaging signals of the overlapping area such that a luminance of the overlapping area shown in images taken from each of the two image pickup devices is similar and that difference in luminance of the overlapping area shown in surrounding images generated using the images taken from each of the two image pickup devices is alleviated without pixel compensation.

14. The method of adjusting metering according to claim 13, wherein the overlapping shooting area is also in the direction of vehicle travel.

15. The method of adjusting metering according to claim 14, wherein the direction of vehicle travel is estimated on the basis of a gear position of the vehicle.

16. The method of adjusting metering according to claim 13, wherein an area broader than the at least one overlapping area by a predetermined amount is determined to be the metering area.

* * * * *